(12) United States Patent
Jung et al.

(10) Patent No.: US 8,903,433 B2
(45) Date of Patent: Dec. 2, 2014

(54) PAGING METHOD AND APPARATUS CONSIDERING CARRIER AGGREGATION ENVIRONMENT IN MOBILE COMMUNICATION SYSTEM

(75) Inventors: Kwang Ryul Jung, Daejeon (KR); Aesoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 790 days.

(21) Appl. No.: 12/939,761

(22) Filed: Nov. 4, 2010

(65) Prior Publication Data
US 2011/0105141 A1     May 5, 2011

(30) Foreign Application Priority Data

Nov. 4, 2009    (KR) .................. 10-2009-0106001
Jul. 22, 2010   (KR) .................. 10-2010-0070990

(51) Int. Cl.
| | | |
|---|---|---|
| *H04W 68/00* | (2009.01) | |
| *H04W 4/00* | (2009.01) | |
| *H04B 7/00* | (2006.01) | |
| *H04W 48/12* | (2009.01) | |
| *H04W 28/08* | (2009.01) | |

(52) U.S. Cl.
CPC ............. *H04W 68/00* (2013.01); *H04W 48/12* (2013.01); *H04W 28/08* (2013.01)
USPC ................. 455/458; 455/426.1; 455/515

(58) Field of Classification Search
CPC .... H04W 68/02; H04W 88/06; H04W 84/027

USPC ........................................ 455/458, 426.1, 515
See application file for complete search history.

(56) References Cited

U.S. PATENT DOCUMENTS

| | | | |
|---|---|---|---|
| 2006/0116123 A1 | 6/2006 | Purnadi et al. | |
| 2009/0186627 A1* | 7/2009 | Zhang | 455/453 |
| 2010/0130218 A1* | 5/2010 | Zhang et al. | 455/450 |
| 2010/0227569 A1* | 9/2010 | Bala et al. | 455/73 |
| 2010/0271175 A1* | 10/2010 | Chou et al. | 340/7.25 |

FOREIGN PATENT DOCUMENTS

| | | |
|---|---|---|
| KR | 1020030032780 | 4/2003 |
| KR | 1020090009907 | 4/2009 |
| KR | 1020090074991 | 7/2009 |

* cited by examiner

*Primary Examiner* — Omoniyi Obayanju
(74) *Attorney, Agent, or Firm* — Nelson Mullins Riley & Scarborough LLP; Anthony A. Laurentano, Esq.; Lewis Lee, Esq.

(57) ABSTRACT

Provided is a paging method and apparatus considering a carrier aggregation (CA) environment in a mobile communication system. A paging method of a user equipment may include: selecting a component carrier (CC) set of the user equipment by selecting a CC for each component carrier element (CCE); receiving, from an evolved Node-B (eNB), a paging message containing a CC set; setting up a connection with the eNB through the CC set of the user equipment when the received CC set is the same as the CC set of the user equipment, or when all the CCs are included in the received CC set; and changing the CC set of the user equipment to the received CC set and setting up the connection with the eNB through the changed CC set when the received CC set is different from the CC set of the user equipment.

10 Claims, 9 Drawing Sheets

PAGING METHOD AND APPARATUS CONSIDERING CARRIER AGGREGATION ENVIRONMENT IN MOBILE COMMUNICATION SYSTEM

CROSS-REFERENCE TO RELATED APPLICATION

This application claims the benefit of Korean Patent Application No. 10-2009-0106001, filed on Nov. 4, 2009, and Korean Patent Application No. 10-2010-0070990, filed on Jul. 22, 2010, in the Korean Intellectual Property Office, the disclosures of which are incorporated herein by reference.

BACKGROUND

1. Field of the Invention

The present invention relates to a paging procedure, and more particularly, to a paging method and apparatus in a carrier aggregation (CA) environment of a mobile communication system.

2. Description of the Related Art

A conventional mobile communication system, for example, a $3^{rd}$ Generation Partnership Project (3GPP) Long Term Evolution (LTE) system may support a high rate of mobile communication service using a maximum of 20 MHz. However, as a service type, a required data rate, and the like are being diversified, a faster mobile communication system has been desired. For this, an International Mobile Telecommunication (IMT)-Advanced system has supported a relatively wide band, for example, a maximum of 100 MHz compared to conventional 3GPP LTE Release-8. In general, even though a frequency of a mobile communication uses a contiguous spectrum, a support for non-contiguous spectrum has been currently required due to a complexity of a user element and the like. In addition, a reuse of a frequency being used in an existing mobile communication has been required. A band expansion of at least 20 MHz may be performed through a carrier aggregation (CA). A relatively wide frequency bandwidth may be secured through integration of component carriers (CCs). From a view of an LTE user element, each CC may appear as an LTE frequency. Accordingly, it is possible to maintain a compatibility with a previous system.

Since a conventional mobile communication system does not consider a method with respect to the above non-contiguous spectrum, it is difficult to provide an effective communication method using CCs of the non-contiguous spectrum newly required. In the case of paging for an incoming call setup to a user equipment, a CC that is selected by the user equipment and thereby is in an idle state may be different from a CC for the user equipment that is determined by an evolved Node-B (eNB). In this case, it may be difficult to smoothly perform scheduling of the eNB, or an additional procedure such as a handover to another CC may need to be performed after the call setup. When the eNB may not control a CC of the user equipment, load balancing for effectively using resources between CCs may not be properly performed. Accordingly, a congestion may occur in a particular CC. The additional procedure after the call setup may deteriorate a quality of service (QoS) due to an increase in the ineffective call processing procedure.

SUMMARY

An aspect of the present invention provides a paging method and apparatus considering a carrier aggregation environment in a mobile communication system.

Another aspect of the present invention also provides a paging procedure in a mobile communication system using component carriers of a non-contiguous spectrum.

According to an aspect of the present invention, there is provided a paging method of a user equipment in a carrier aggregation environment, the method including: selecting a component carrier set of the user equipment by selecting a component carrier for each component carrier element; camping on a cell through the component carrier selected for each component carrier element; receiving a paging message from an evolved Node-B (eNB); verifying a component carrier set that is included in the paging message and thereby is received; comparing the received component carrier set with the component carrier set of the user equipment; and setting up a connection with the eNB through the component carrier set of the user equipment, when the received component carrier set is the same as the component carrier set of the user equipment, or when all the component carriers are included in the received component carrier set.

According to another aspect of the present invention, there is provided a paging method of an eNB in a carrier aggregation environment, the method including: receiving a paging request; setting a component carrier set of a user equipment in response to the paging request; generating a paging message containing information associated with the component carrier set; transmitting the paging message to the user equipment through all the component carriers of the eNB; and performing a random access with the user equipment through a primary component carrier included in the component carrier set.

According to still another aspect of the present invention, there is provided a user equipment paging in a carrier aggregation environment, the user equipment including: at least two component carrier elements, each to communicate with an evolved Node-B (eNB) using a different component carrier; a control unit to select a component carrier set of the user equipment by selecting a component carrier for each component carrier element, and to control the user equipment to camp on a cell through the component carrier selected for each component carrier element; and a paging processing unit to verify a component carrier set that is included in a paging message and thereby is received when the paging message is received from the eNB, to compare the received component carrier set with the component carrier set of the user equipment, and to set up a connection with the eNB through the component carrier set of the user equipment when the received component carrier set is the same as the component carrier set of the user equipment, or when all the component carriers are included in the received component carrier set.

According to yet another aspect of the present invention, there is provided an eNB paging in a carrier aggregation environment, including: a network communication unit to receive a paging request; at least two component carrier elements, each to perform a communication using a different component carrier; a call processing unit to set a component carrier set of a user equipment in response to the paging request; and a paging processing unit to generate a paging message containing information associated with the component carrier set, to transmit the paging message to the user equipment through all of the at least two component carrier elements, and to perform a random access with the user equipment through a primary component carrier included in the component carrier set.

According to embodiments of the present invention, there may be provided a paging method and apparatus in a mobile communication system using component carriers of a non-contiguous spectrum. Since a component carrier selection of a user equipment is controllable through load balancing in the case of paging at an eNB of the mobile communication system, it is possible to decrease a congestion in a component carrier, and to increase a resource use efficiency.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
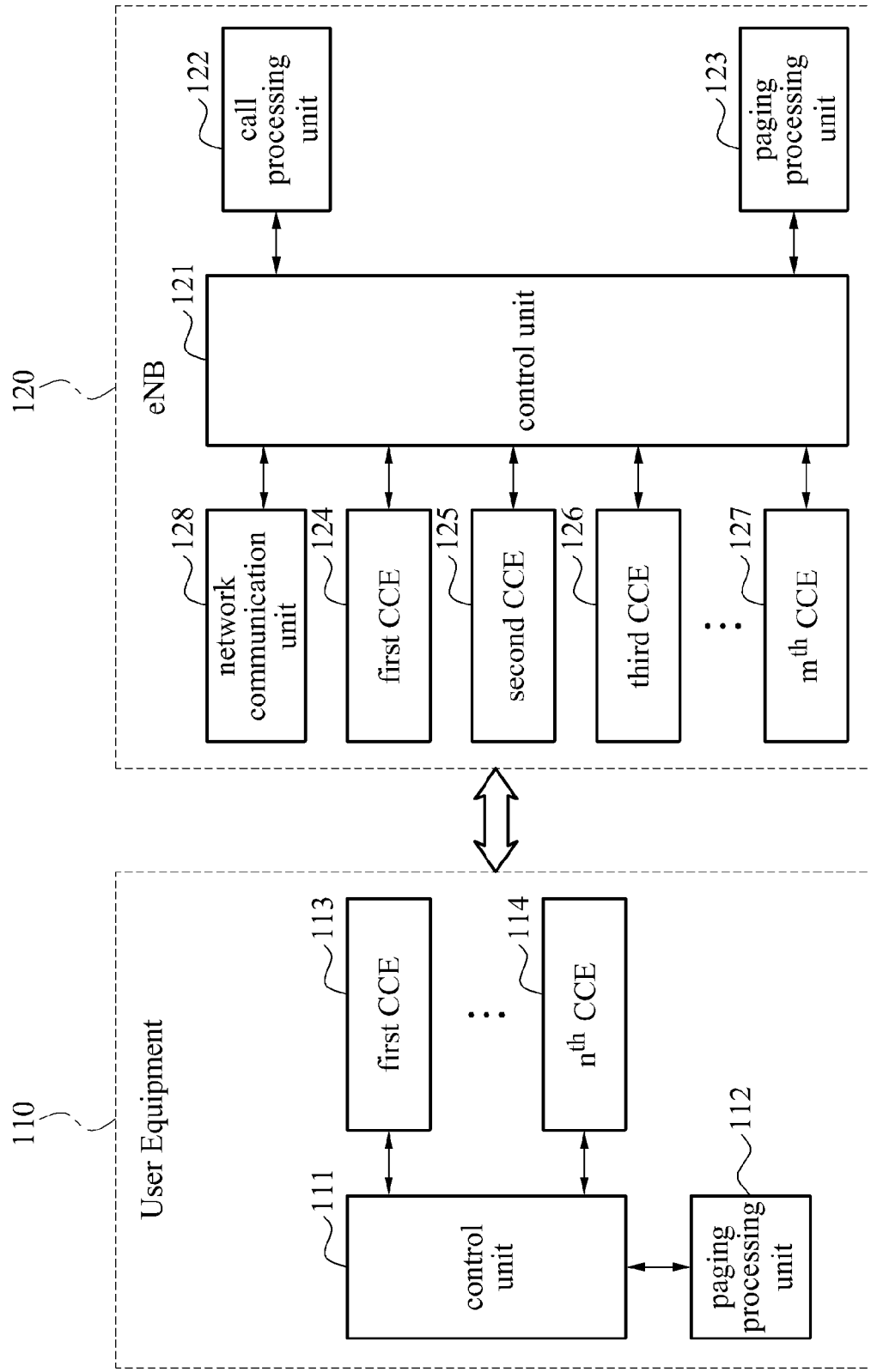
FIG. 1 is a diagram illustrating a configuration of a mobile communication system paging based on a carrier aggregation (CA) environment according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a mobile communication system paging based on a carrier aggregation (CA) environment according to an embodiment of the present invention.

Referring to FIG. 1, the mobile communication system paging based on the CA environment may include a user equipment 110 and an evolved Node-B (eNB) 120 that is a base station.

The user equipment 110 may include a control unit 111, a paging processing unit 112, a first component carrier element (CCE) 113, ..., an $n^{th}$ CCE 114.

Here, each of the first CCE 113, ..., the $n^{th}$ CCE 114 may communicate with the eNB 120 using a different component carrier (CC).

The control unit 111 may control a general operation of the user equipment 110, and select a CC set of the user equipment 110 by selecting a CC for each of the first CCE 113, ..., the $n^{th}$ CCE 114, and may control the user equipment 110 to camp on a cell through the CC selected for each of the first CCE 113, ..., the $n^{th}$ CCE 114.

When a paging message is received from the eNB 120, the paging processing unit 112 may verify a CC set that is included in the paging message and thereby is received, and may compare the received CC set with the CC set of the user equipment 110. When the received CC set is the same as the CC set of the user equipment 110, or when all the CCs are included in the received CC set, the paging processing unit 112 may set up a connection with the eNB 120 through the CC set of the user equipment 110.

When the received CC set is different from the CC set of the user equipment 110, the paging processing unit 112 may change the CC set of the user equipment 110 to the received CC set, and may set up the connection with the eNB 120 through the CC set of the user equipment 110.

The eNB 120 may include a control unit 121, a call processing unit 122, a paging processing unit 123, a first CCE 124, a second CCE 125, a third CCE 126, ..., an $m^{th}$ CCE 127, and a network communication unit 128.

The network communication unit 128 may receive a paging request over an external network.

Each of the first CCE 124, the second CCE 125, the third CCE 126, ..., the $m^{th}$ CCE 127 may communicate with the user equipment 110 through m CCs used at the eNB 120.

In response to the paging request, the call processing unit 122 may set the CC set of the user equipment 110.

The paging processing unit 123 may generate the paging message containing information associated with the CC set, and may transmit the paging message to the user equipment 110 through all of the first CCE 124, the second CCE 125, the third CCE 126, ..., the $m^{th}$ CCE 127, and may perform a random access with the user equipment 110 through a primary CC included in the CC set.

The eNB 120 may include CC information corresponding to a maximum number of CCs accessible by the user equipment 110, based on a call admission control (CAC)/load balancing (LB) result. When the user equipment 110 is accessible to all the CCs, the paging message may be configured by including CC information corresponding to the number of CCEs of the eNB 120.

The eNB 120 may generate the paging message by assigning a dedicated preamble for each user equipment. Depending on embodiments, the eNB 120 may not include dedicated preamble information in the paging message. The user equipment 110 receiving the paging message may need to perform a random access procedure using a random preamble.

The control unit 121 may control a general operation of the eNB 120, and may control a Master Information Base (MIB) and a System Information Block (SIB) to be transmitted through each of the first CCE 124, the second CCE 125, the third CCE 126, ..., the $m^{th}$ CCE 127 at predetermined time intervals.

Hereinafter, a paging method considering a CA environment in a mobile communication system will be described.

Figure 2:
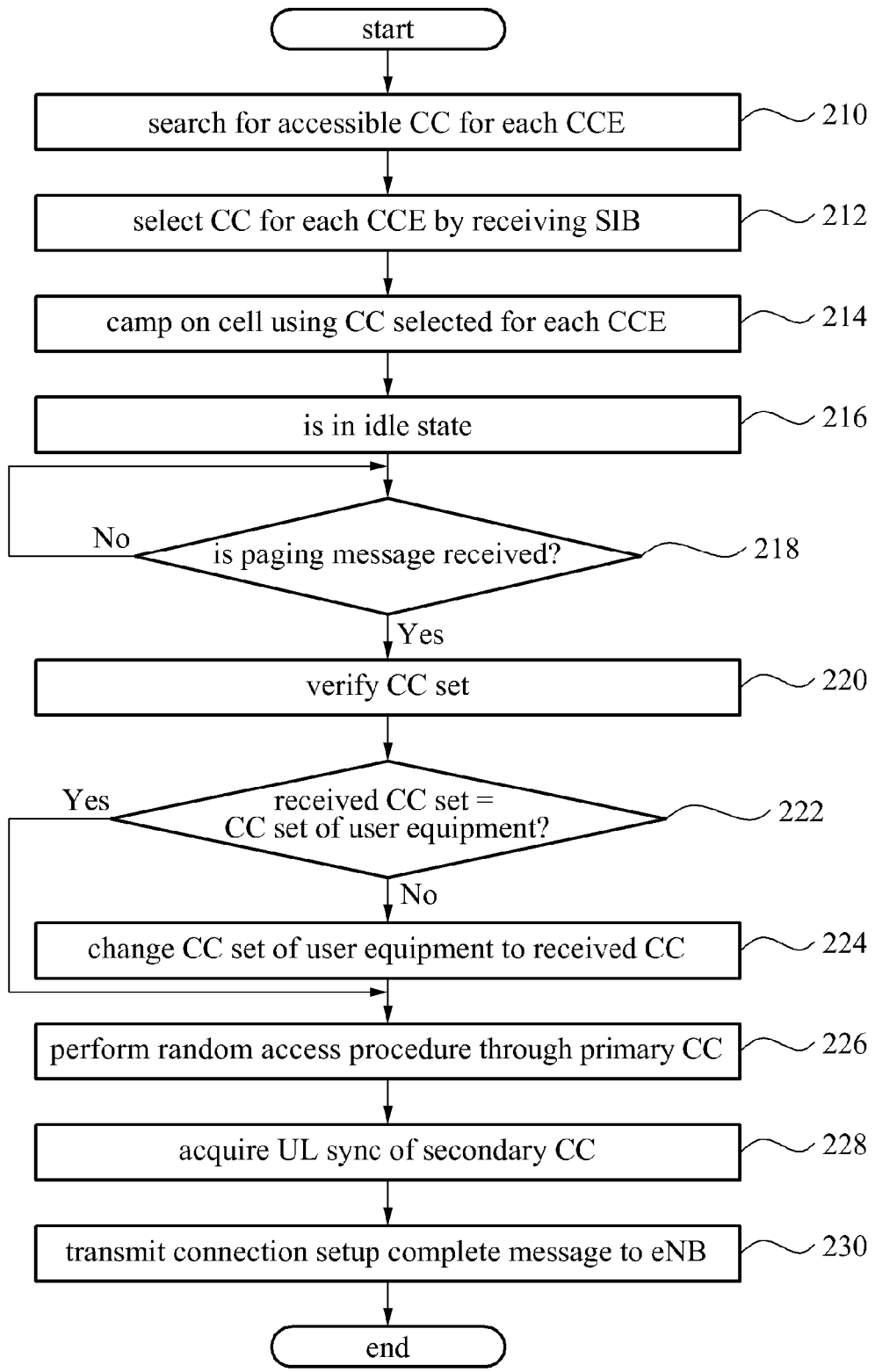
FIG. 2 is a flowchart illustrating a paging process at a user equipment according to an embodiment of the present invention.

FIG. 2 is a flowchart illustrating a paging process at the user equipment 110 according to an embodiment of the present invention.

Referring to FIG. 2, in operation 210, the user equipment 110 may search for an accessible CC for each CCE.

In operation 212, the user equipment 110 may select a CC set of the user equipment 110 by receiving an SIB from the eNB 120, and by selecting a CC for each CCE. In this instance, the user equipment 110 may need to select a different CC for each CCE. This may be performed by separately informing a CC for each CCE, or by separately informing a search carrier range for each CCE when a CC selection request is received from an upper layer of the user equipment 110. In this instance, information associated with the CC stored for each CCE in a final termination time, a preferred CC for each CCE, and the like may be used. The upper layer of the user equipment 110 may request another cell to be selected, based on information associated with the CC selected for each CCE.

In operation 214, the user equipment 110 may camp on a cell through the CC selected for each CCE. In operation 216, the user equipment 110 may operate in an idle state.

When a paging message is received from the eNB 120 in operation 218, the user equipment 110 may verify a CC set that is included in the paging message and thereby is received in operation 220.

In operation 222, the user equipment 110 may determine whether the received CC set is the same as the CC set of the user equipment 110.

When the received CC set is the same as the CC set of the user equipment 110, or when all the CCs are included in the received CC set in operation 222, the user equipment 110 may go to operation 226.

Conversely, when the received CC set is different from the CC set of the user equipment 110, the user equipment 110 may change the CC set of the user equipment 110 to the received CC set in operation 224. The above change is to change a primary CC and a secondary CC included in the CC set of the user equipment 100 to be the same as a primary CC and a secondary CC included in the received CC set.

In operation 226, the user equipment 110 may perform a random access through the primary CC included in the CC set of the user equipment 100. When a dedicated preamble of the primary CC is included in the received CC set, the user equipment 110 may perform the random access through the primary CC using the dedicated preamble.

In operation 228, the user equipment 110 may acquire an uplink synchronization of the secondary CC included in the CC set of the user equipment 110. In this instance, the uplink synchronization of the secondary CC may be acquired by performing the random access through the secondary CC, and may also be acquired by receiving a timing alignment of the secondary CC. Here, the timing alignment of the secondary CC may be received from the eNB 120 when the user equipment 110 performs the random access through the primary CC. When the random access is performed through the primary CC, when the dedicated preamble of the secondary CC is received, and when the random access through the secondary CC is performed to acquire the uplink synchronization of the secondary CC, the random access of the secondary CC may be performed using the dedicated preamble of the secondary CC.

When the connection setup of the CC set is completed, the user equipment 110 may transmit, to the eNB 120, a connection setup complete message indicating that the connection setup is completed in operation 230.

Figure 3:
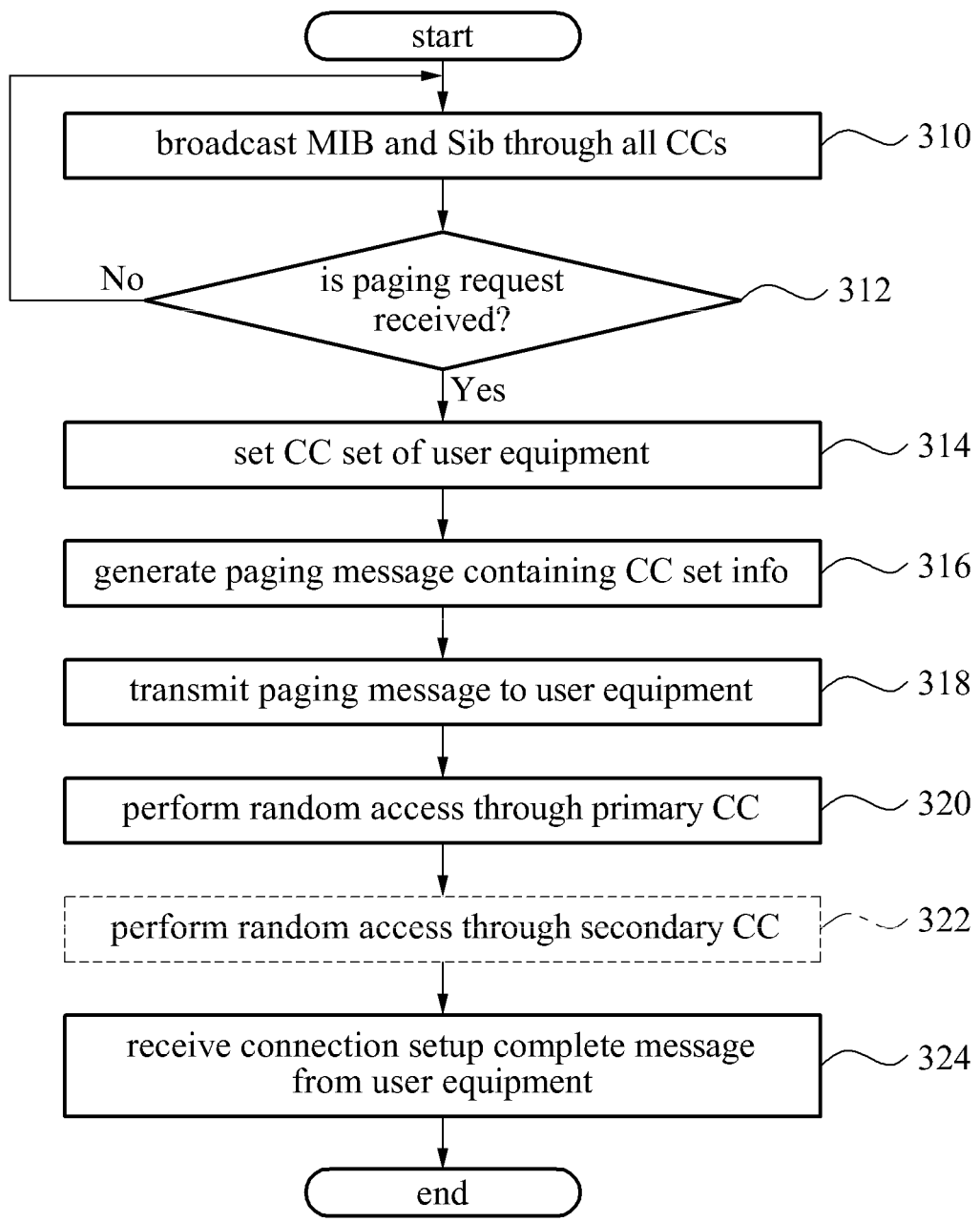
FIG. 3 is a flowchart illustrating a paging process at an evolved Node-B (eNB) according to an embodiment of the present invention.

FIG. 3 is a flowchart illustrating a paging process at the eNB 120 according to an embodiment of the present invention.

Referring to FIG. 3, in operation 310, the eNB 120 may broadcast an MIB and an SIB through all the CCs of the eNB 120. When the eNB 120 receives a paging request from a network in operation 312, the eNB 120 may set a CC set of the user equipment 110 in response to the paging request in operation 314. When setting the CC set of the user equipment 110, the eNB 120 may set the CC set of the user equipment 110 through load balancing to prevent traffic from being concentrated on a particular CC among CCs used by the eNB 120.

In operation 316, the eNB 120 may generate a paging message containing CC set information. In operation 318, the eNB 120 may transmit the paging message to the user equipment 110 through all the CCs of the eNB 120.

In operation 320, the eNB 120 may perform a random access with the user equipment 110 through a primary CC of the CC set.

In operation 322, the eNB 120 may perform a random access procedure through a secondary CC of the CC set. Operation 322 may be omitted. When timing alignment of the secondary CC is included in the CC set and thereby is transmitted, the user equipment 110 may acquire uplink synchronization using the timing alignment without performing the random access. Accordingly, operation 322 may be omitted.

In operation 324, the eNB 120 may receive, from the user equipment 110, a connection setup complete message indicating that a connection setup of the CC set is completed.

Figure 4:
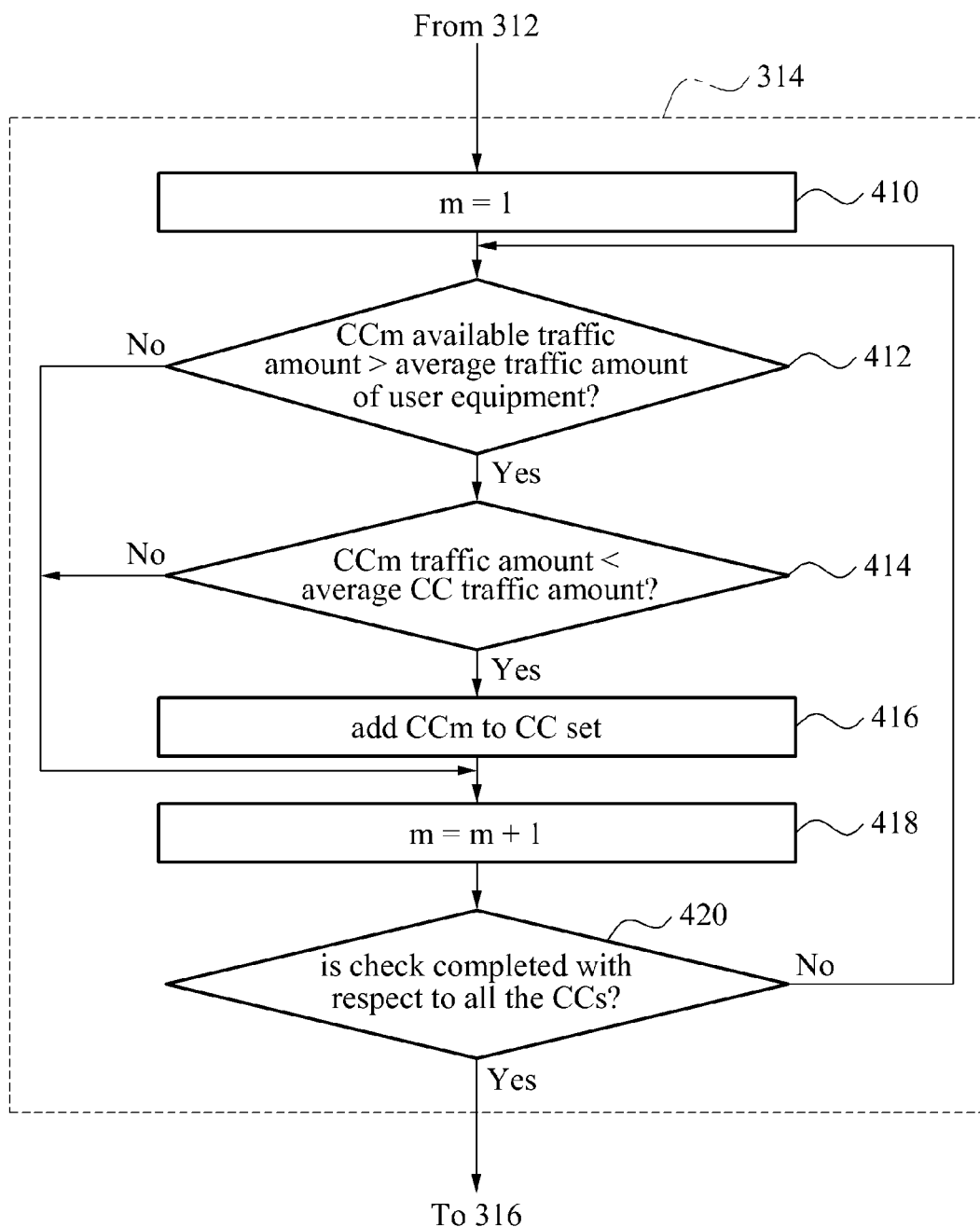
FIG. 4 is a flowchart illustrating a process of setting a component carrier (CC) set at an eNB according to an embodiment of the present invention.

FIG. 4 is a flowchart illustrating a process of setting a CC set at the eNB 120 according to an embodiment of the present invention. FIG. 4 illustrates an example of setting the CC set in operation 314 of FIG. 3.

Referring to FIG. 4, in operation 410, the eNB 120 may initialize m to '1'. Here, m corresponds to a parameter for classifying a CC used at the eNB 120 for setting the CC set.

In operation 412, the eNB 120 may verify whether an available traffic amount of CCm is greater than an average traffic amount requested by the user equipment 110.

When the available traffic amount of CCm is greater than the average traffic amount of the user equipment 110 in operation 412, the eNB 120 may verify whether a traffic amount of CCm is less than the average CC traffic amount in operation 414.

When the traffic amount of CCm is less than the average CC traffic amount in operation 414, the eNB 120 may add CCm to the CC set assigned to the user equipment 110 in operation 416.

In operation 418, the eNB 120 may increase m by '1'. In operation 420, the eNB 120 may verify whether a check of all the CCS of the eNB 120 is completed.

When the check is not completed in operation 420, the eNB 120 may return to operation 412 and repeat operations 412 through 420 until the check is completed with respect to all the CCs of the eNB 120.

Conversely, when the check is completed in operation 420, the eNB 120 may go to operation 316.

When the available traffic amount of CCm is not greater than the average traffic amount of the user equipment 110 in operation 412, or when the traffic amount of CCm is less than the average CC traffic amount in operation 414, the eNB 120 may go to operation 418.

Figure 5:
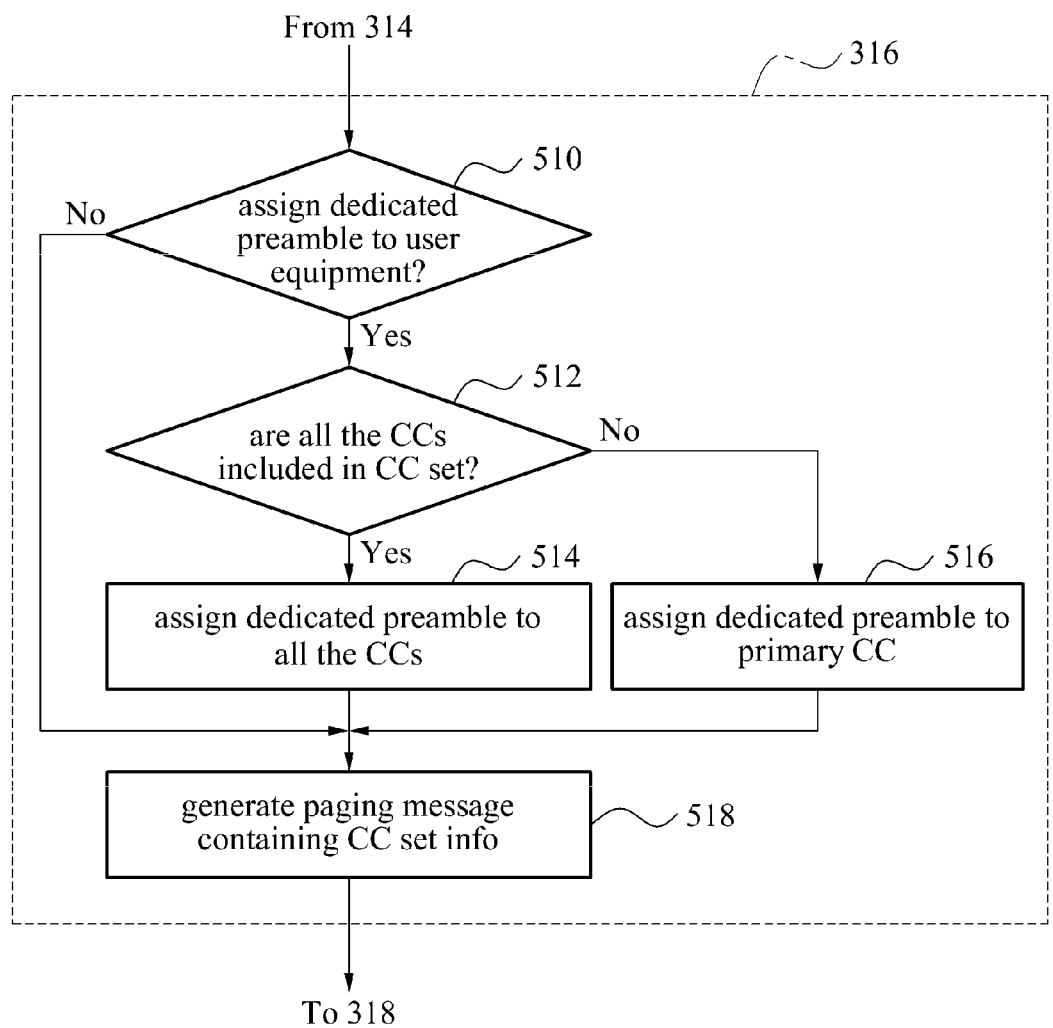
FIG. 5 is a flowchart illustrating a process of generating a paging message at an eNB according to an embodiment of the present invention.

FIG. 5 is a flowchart illustrating a process of generating a paging message at the eNB 120 according to an embodiment of the present invention. FIG. 5 illustrates an example of generating the paging message in operation 316 of FIG. 3.

Referring to FIG. 5, in operation 510, the eNB 120 may verify whether a dedicated preamble is to be assigned to the user equipment 110. In this instance, whether the dedicated preamble is to be assigned to the user equipment 110 may be determined based on at least one of a predetermined user class, a fee type being used, and an emergency.

When the dedicated preamble is determined to not be assigned to the user equipment 110 in operation 510, the eNB 120 may generate a paging message containing information associated with a CC set not assigned with the dedicated preamble in operation 518.

Conversely, when the dedicated preamble is determined to be assigned to the user equipment 110 in operation 510, the eNB 120 may verify whether all the CCs of the eNB 120 are included in the CC set determined in operation 416, in operation 512.

When all the CCs of the eNB 120 are included in the CC set to be assigned to the user equipment 110 in operation 512, the eNB 120 may assign a dedicated preamble corresponding to each of all the CCs in operation 514.

Conversely, when all the CCs of the eNB 120 are not included in the CC set in operation 512, the eNB 120 may assign a dedicated preamble to the primary CC of the CC set in operation 516.

In operation 518, the eNB 120 may generate a paging message containing information associated with a CC set assigned with the dedicated preamble.

Hereinafter, an example of a paging procedure considering a CA environment will be described with reference to FIG. 6 through FIG. 9. FIG. 6 through FIG. 9 illustrates a case where the eNB 120 operate four CCs, for example, CC-a, CC-b, CC-c, and CC-d, and the user equipment includes two CCEs, for example, CCE-a and CCE-b, and a case where the user equipment 110 selects two CCs, for example, CC-a and CC-b to perform a call connection setup procedure according to paging of the eNB 120 is in an idle state.

Figure 6:
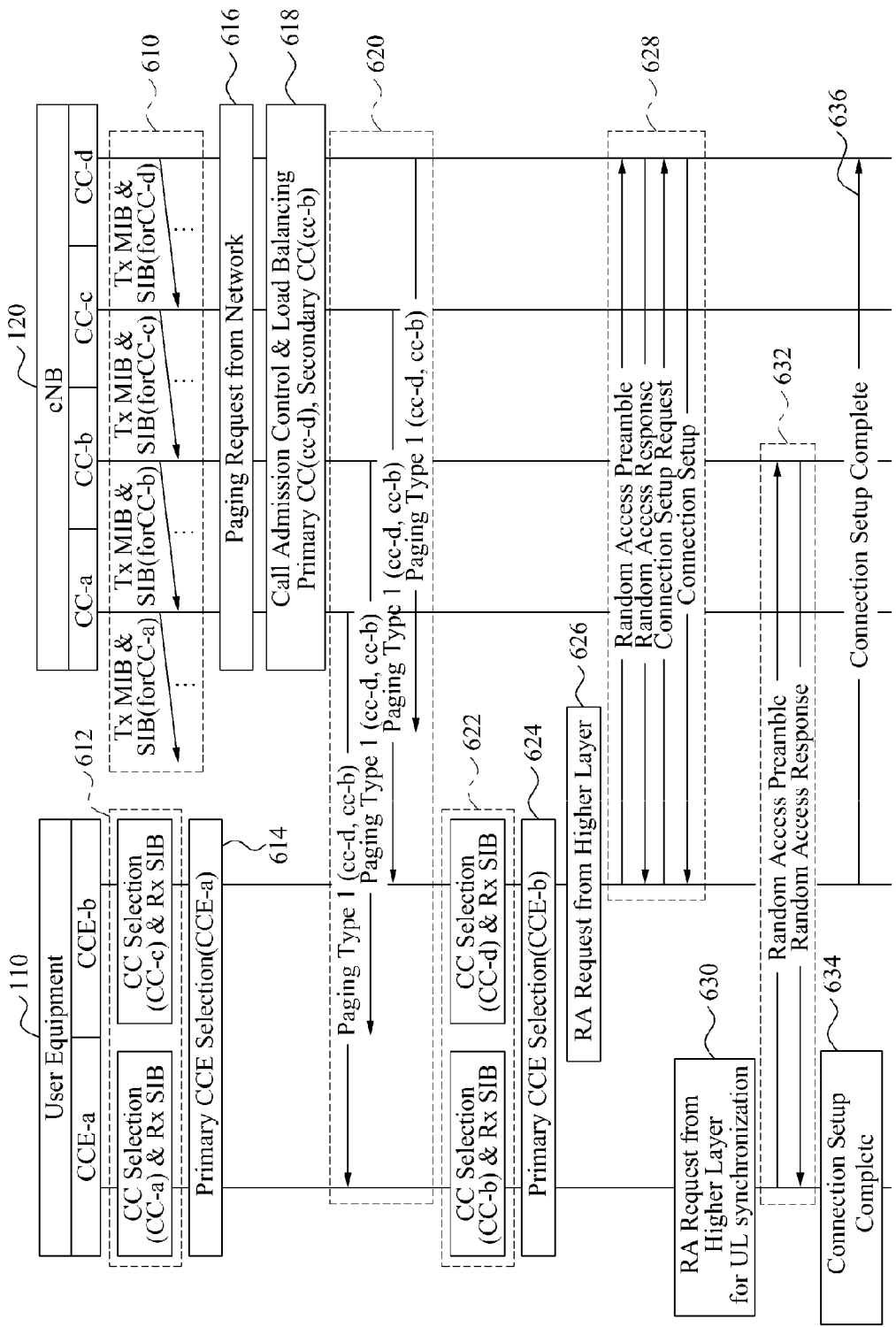
FIG. 6 is a diagram illustrating a paging procedure when a CC set selected by a user equipment is different from a CC set selected by an eNB according to an embodiment of the present invention.

FIG. 6 is a diagram illustrating a paging procedure when a CC set selected by a user equipment 110 is different from a CC set selected by an eNB 120 according to an embodiment of the present invention.

Referring to FIG. 6, in operation 610, the eNB 120 may broadcast MIB and SIB through CCs, for example, CC-a, CC-b, CC-c, and CC-d at predetermined time intervals.

When a power is applied to the user equipment 110, the user equipment 110 may search for accessible CCs through each of CCE-a and CCE-b according to a request of an upper layer, and may receive system information of a corresponding cell and perform an operation of selecting CC-a and CC-c in operation 612.

In operation 614, the user equipment 110 may select, as primary CCE, CCE-a from CCE-a and CCE-b.

The user equipment 110 may camp on a cell using a different CC selected for each of CCE-a and CCE-b and then operate in an idle state. For example, the user equipment 110 may wait for an originating signal of a user of the user equipment 110 or an incoming signal of a user of another user equipment.

When a paging request to the user equipment 110 is received in operation 616, the eNB 120 may select a CC accessible by the user equipment 110 by performing CAC/LB based on a resource state of each CC, a radio state, and the like, and may determine a CC set to be connected by the user equipment 110. Here, CAC/LB may prevent traffic from being concentrated on a particular CC among CCs used at the eNB 120.

In operation 620, the eNB 120 may include determined CC set information in a paging message and thereby transfer the paging message to the user equipment 110. Since the eNB 120 is unaware of a CC waited by the user equipment 110, the eNB 120 may transmit the same paging message through all the CCs.

When the user equipment 110 receiving the paging message of the eNB 120 verifies that the paging message indicates the corresponding user equipment 110, the user equipment 110 may perform a call connection procedure based on the received CC set information.

As shown in FIG. 6, when the CC set waited by the user equipment 110 is different from the CC set informed by the eNB 120 using the paging message, the user equipment 110 may change the CC set to the CC set informed by the eNB 120 in operation 622. In operation 624, the user equipment 110 may select, as a primary CCE, CCE-b from CCE-a and CCE-b, and change a primary CC to be the same as a primary CC at the eNB 120.

When the user equipment 110 receives a random access request from an upper layer in operation 626, the user equipment 110 may perform a random access with the eNB 120 using CC-d in operation 628.

The eNB 120 may generate the paging message by assigning a dedicated preamble used for the random access procedure in the primary CC based on paged user information, for example, a user class, a fee type, emergency, and the like. In this case, since a backoff time occurring due to a collision may decrease, a call setup time of the user equipment 110 may also decrease.

When the dedicated preamble with respect to corresponding CC is included in the received paging message, the user equipment 110 may perform the random access procedure using the dedicated preamble in operation 628. Conversely, when dedicated preamble information is not included in the paging message, the user equipment 110 may arbitrarily select and use one of a preamble set of corresponding CC, for example, CC-d included in the received system message.

When an arbitrarily selected random preamble is not used by another user equipment, that is, a collision does not occur and thus, the eNB 120 receives the arbitrarily selected random preamble, or when the eNB 120 receives the dedicated preamble transmitted from the user equipment 110, the eNB 120 may transmit a random access response message to the user equipment 110. The user equipment 110 may acquire uplink synchronization from the random access response message. The user equipment 110 may be assigned from the upper layer with an uplink resource capable of transferring a transmission request message for connection setup. The user equipment 110 may transmit, to the eNB 120, a connection setup request message containing a number of CCEs of the user equipment 110, and selected CC information, and the like.

When the connection setup request message of the user equipment 110 is received, the eNB 120 may omit a CAC/LB procedure based on identification (ID) information of the user equipment 110 stored in paging, or may perform again the CAC/LB procedure without considering prior information, and thereby transmit a connection setup admission message to the user equipment 110.

The connection setup admission message may include dedicated preamble information for a different CCE included in the user equipment 110. In this case, the user equipment 110 may quickly perform an uplink synchronization acquirement procedure through the random access in operation 632.

When the user equipment 110 receives a random access request from the upper layer for uplink synchronization in operation 630, the user equipment 110 may acquire the uplink synchronization through the random access in operation 632.

When it is possible to calculate uplink synchronization information of another CC using uplink synchronization information of a particular CC such as CC using a contiguous spectrum, timing alignment may be included in the connection setup admission message. In this case, the user equipment 110 may omit the random access of operation 632 and acquire synchronization.

When the connection setup of CCE (CCE-a, CCE-b) is completed in operation 634, the user equipment 110 may transmit, to the eNB 120 through CC-d, a connection setup complete message indicating that the connection setup is completed in operation 636.

Figure 7:
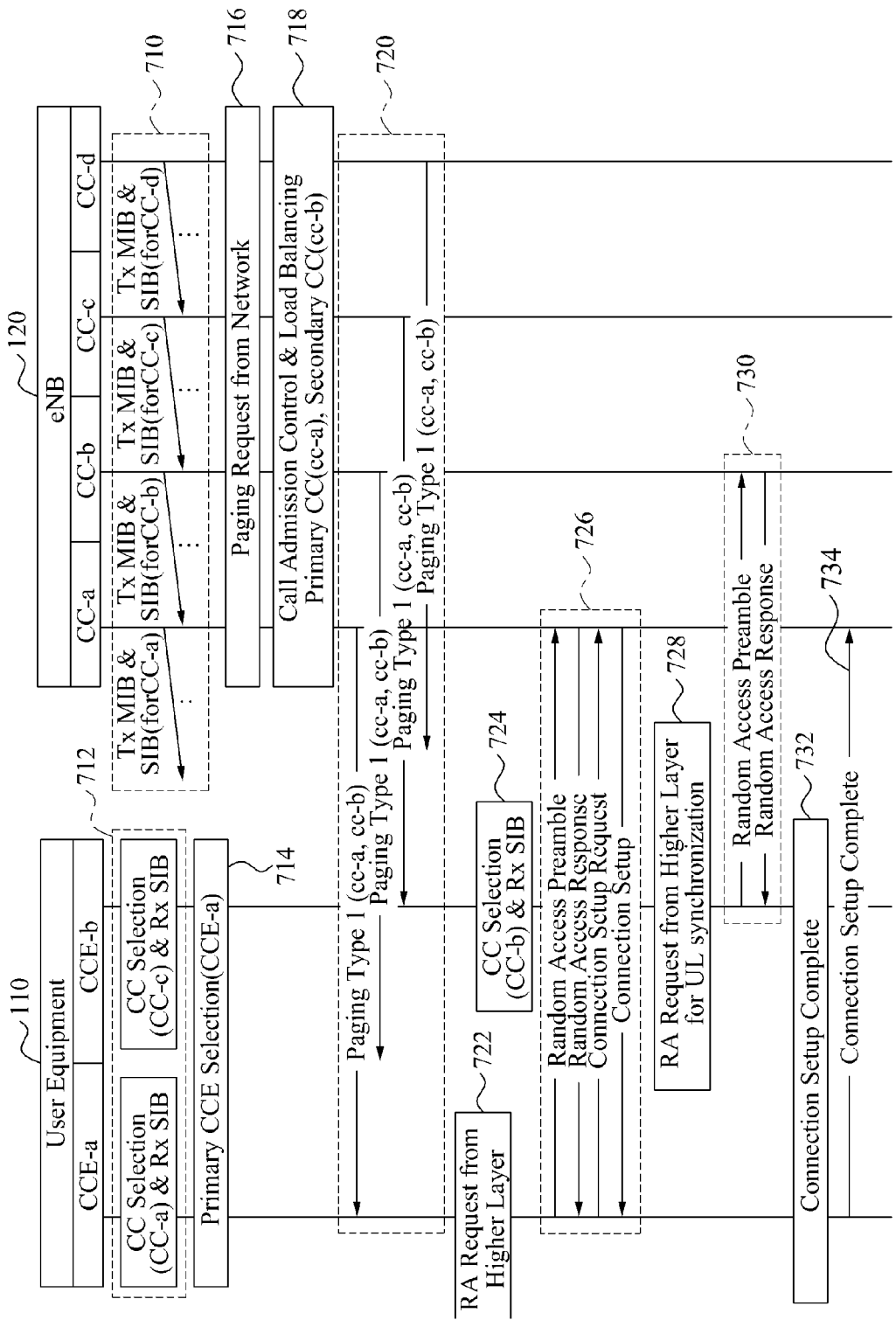
FIG. 7 is a diagram illustrating a paging procedure when a primary CC of a CC set selected by a user equipment is the same as a primary CC of a CC set selected by an eNB according to an embodiment of the present invention.

FIG. 7 is a diagram illustrating a paging procedure when a primary CC of a CC set selected by a user equipment 110 is the same as a primary CC of a CC set selected by an eNB 120 according to an embodiment of the present invention.

Referring to FIG. 7, in operation 710, the eNB 120 may broadcast MIB and SIB through CCs, for example, CC-a, CC-b, CC-c, and CC-d at predetermined time intervals.

When a power is applied to the user equipment 110, the user equipment 110 may search for accessible CCs through each of CCE-a and CCE-b according to a request of an upper layer, and may receive system information of a corresponding cell and perform an operation of selecting CC-a and CC-c in operation 712.

In operation 714, the user equipment 110 may select, as primary CCE, CCE-a from CCE-a and CCE-b.

The user equipment 110 may camp on a cell using a different CC selected for each of CCE-a and CCE-b and then operate in an idle state. For example, the user equipment 110 may wait for an originating signal of a user of the user equipment 110 or an incoming signal of a user of another user equipment.

When a paging request to the user equipment 110 is received in operation 716, the eNB 120 may select a CC accessible by the user equipment 110 by performing CAC/LB based on a resource state of each CC, a radio state, and the like, and may determine a CC set to be connected by the user equipment 110. Here, CAC/LB may prevent traffic from being concentrated on a particular CC among CCs used at the eNB 120.

In operation 720, the eNB 120 may include determined CC set information in a paging message and thereby transfer the paging message to the user equipment 110. Since the eNB 120 is unaware of a CC waited by the user equipment 110, the eNB 120 may transmit the same paging message through all the CCs.

When the user equipment 110 receiving the paging message of the eNB 120 verifies that the paging message indicates the corresponding user equipment 110, the user equipment 110 may perform a call connection procedure based on the received CC set information.

As shown in FIG. 7, when a primary CC in the CC set selected by the eNB 120 through CAC/LB is matched with a primary CC in the CC set waited by the user equipment 110, and when the user equipment 110 receives a random access request from the upper layer in operation 722, the user equipment 110 may perform a random access with the eNB 120 through CC-a in operation 726. In this instance, the random access procedure may be performed using the dedicated preamble received through CC selected by corresponding CCE, or using the selected random preamble.

While performing the random access in operation 726, the user equipment 110 may change a secondary CC to another CC (CC-b, CCE-b) requested by the eNB 120 in operation 724.

When the user equipment 110 receives a random access request from the upper layer for uplink synchronization in operation 728, the user equipment 110 may acquire the uplink synchronization through the random access in operation 730.

When it is possible to calculate uplink synchronization information of another CC using uplink synchronization information of a particular CC such as CC using a contiguous spectrum, timing alignment may be included in the connection setup admission message. In this case, the user equipment 110 may omit the random access of operation 730 and acquire synchronization.

When the connection setup of CCE (CCE-a, CCE-c) is completed in operation 732, the user equipment 110 may transmit, to the eNB 120 through CC-a, a connection setup complete message indicating that the connection setup is completed in operation 734.

Figure 8:
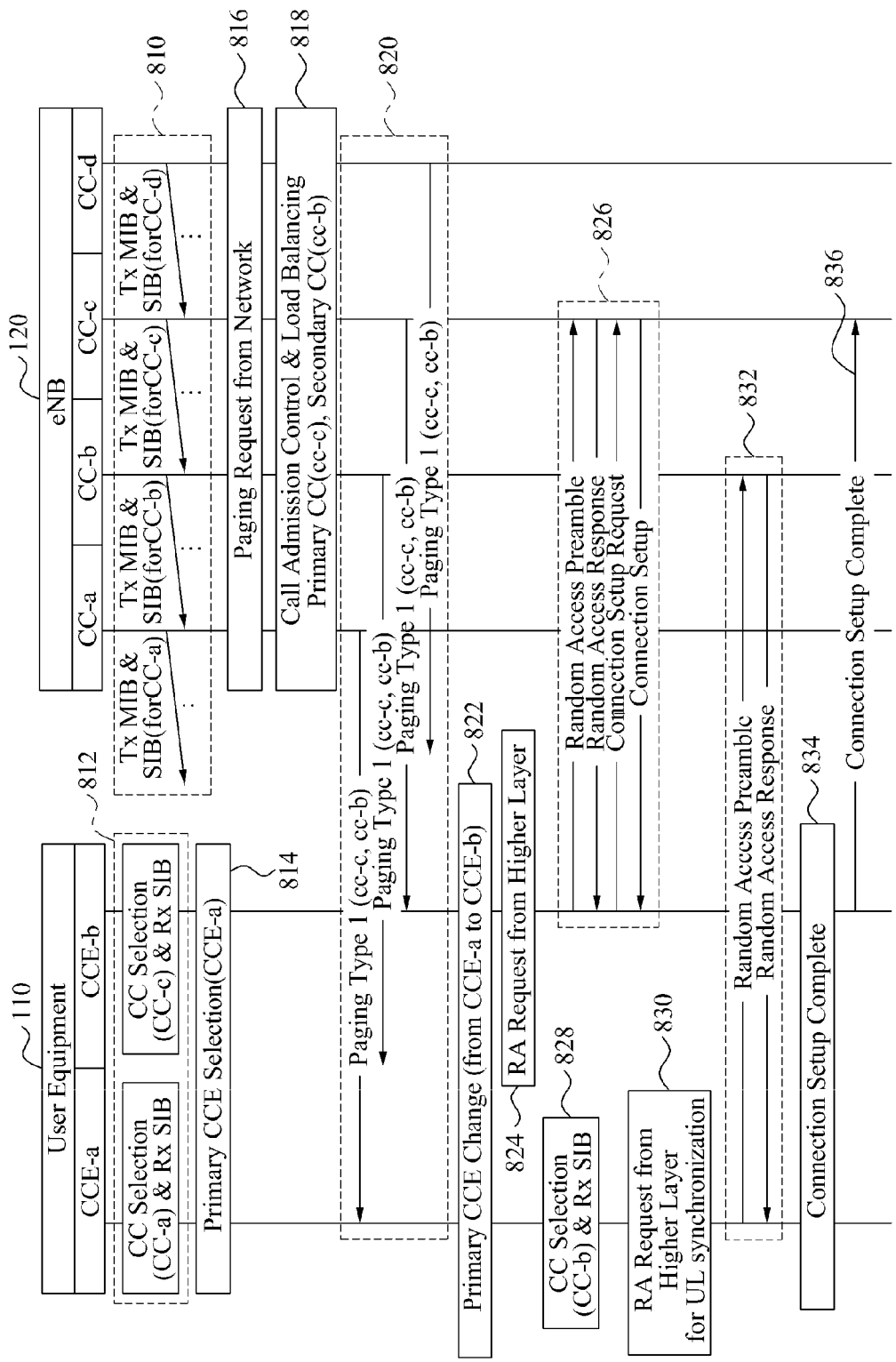
FIG. 8 is a diagram illustrating a paging procedure when a secondary CC of a CC set selected by a user equipment is the same as a secondary CC of a CC set selected by an eNB according to an embodiment of the present invention.

FIG. 8 is a diagram illustrating a paging procedure when a secondary CC of a CC set selected by a user equipment 110 is the same as a secondary CC of a CC set selected by an eNB 120 according to an embodiment of the present invention.

Referring to FIG. 8, in operation 810, the eNB 120 may broadcast MIB and SIB through CCs, for example, CC-a, CC-b, CC-c, and CC-d at predetermined time intervals.

When a power is applied to the user equipment 110, the user equipment 110 may search for accessible CCs through each of CCE-a and CCE-b according to a request of an upper layer, and may receive system information of a corresponding cell and perform an operation of selecting CC-a and CC-c in operation 812.

In operation 814, the user equipment 110 may select, as primary CCE, CCE-a from CCE-a and CCE-b.

The user equipment 110 may camp on a cell using a different CC selected for each of from CCE-a and CCE-b and then operate in an idle state. For example, the user equipment 110 may wait for an originating signal of a user of the user equipment 110 or an incoming signal of a user of another user equipment.

When a paging request to the user equipment 110 is received in operation 816, the eNB 120 may select a CC accessible by the user equipment 110 by performing CAC/LB based on a resource state of each CC, a radio state, and the like, and may determine a CC set to be connected by the user equipment 110. Here, CAC/LB may prevent traffic from being concentrated on a particular CC among CCs used at the eNB 120.

In operation 820, the eNB 120 may include determined CC set information in a paging message and thereby transfer the paging message to the user equipment 110. Since the eNB 120 is unaware of a CC waited by the user equipment 110, the eNB 120 may transmit the same paging message through all the CCs.

When the user equipment 110 receiving the paging message of the eNB 120 verifies that the paging message indicates the corresponding user equipment 110, the user equipment 110 may perform a call connection procedure based on the received CC set information.

As shown in FIG. 8, when the CC set selected by the eNB 120 through CAC/LB is not matched with the CC set waited by the user equipment 110, however, when a primary CC of the CC set selected by the eNB 120 is included in the CC set of the user equipment 110, the user equipment 110 may change a primary CC included in the CC set of the user equipment 110 to a primary CC included in the CC set of the eNB 120. The user equipment 110 may start a call setup procedure based on information included in the paging message.

When the user equipment 110 receives a random access request from the upper layer in operation 824, the user equipment 110 may perform the random access with the eNB 120 through a primary CC (CC-a) in operation 826. In this instance, the random access may be performed using the dedicated preamble received through CC selected by corresponding CCE, or using the selected random preamble.

While performing the random access in operation 826, the user equipment 110 may change a secondary CC to another CC (CC-b, CCE-b) requested by the eNB 120 in operation 828.

When the user equipment 110 receives a random access request from the upper layer for uplink synchronization in operation 830, the user equipment 110 may acquire the uplink synchronization through the random access in operation 832.

When it is possible to calculate uplink synchronization information of another CC using uplink synchronization information of a particular CC such as CC using a contiguous spectrum, timing alignment may be included in the connection setup admission message. In this case, the user equipment 110 may omit the random access of operation 832 and acquire synchronization.

When the connection setup of CCE (CCE-a, CCE-c) is completed in operation 834, the user equipment 110 may transmit, to the eNB 120 through CC-a, a connection setup complete message indicating that the connection setup is completed in operation 836.

Figure 9:
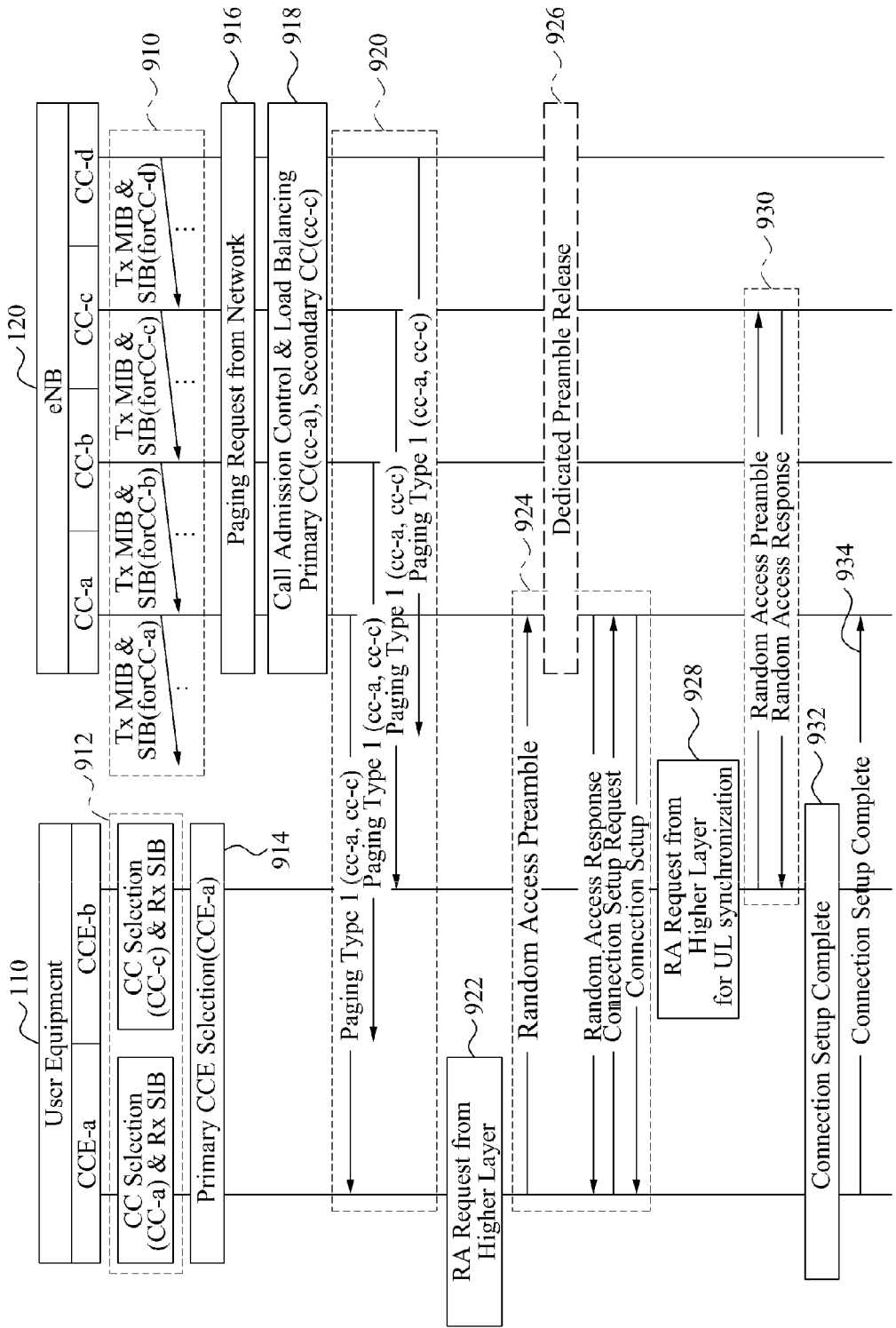
FIG. 9 is a diagram illustrating a paging procedure when a CC set selected by a user equipment is all matched with a CC set selected by an eNB according to an embodiment of the present invention.

FIG. 9 is a diagram illustrating a paging procedure when a CC set selected by a user equipment 110 is all matched with a CC set selected by an eNB 120 according to an embodiment of the present invention.

Referring to FIG. 9, in operation 910, the eNB 120 may broadcast MIB and SIB through CCs, for example, CC-a, CC-b, CC-c, and CC-d at predetermined time intervals.

When a power is applied to the user equipment 110, the user equipment 110 may search for accessible CCs through each of CCE-a and CCE-b according to a request of an upper layer, and may receive system information of a corresponding cell and perform an operation of selecting CC-a and CC-c in operation 912.

In operation 914, the user equipment 110 may select, as primary CCE, CCE-a from CCE-a and CCE-b.

The user equipment 110 may camp on a cell using a different CC selected for each of from CCE-a and CCE-b and then operate in an idle state. For example, the user equipment 110 may wait for an originating signal of a user of the user equipment 110 or an incoming signal of a user of another user equipment.

When a paging request to the user equipment 110 is received in operation 916, the eNB 120 may select a CC accessible by the user equipment 110 by performing CAC/LB based on a resource state of each CC, a radio state, and the like, and may determine a CC set to be connected by the user equipment 110. Here, CAC/LB may prevent traffic from being concentrated on a particular CC among CCs used at the eNB 120.

In operation 920, the eNB 120 may include determined CC set information in a paging message and thereby transfer the paging message to the user equipment 110. Since the eNB 120 is unaware of a CC waited by the user equipment 110, the eNB 120 may transmit the same paging message through all the CCs.

When the user equipment 110 receiving the paging message of the eNB 120 verifies that the paging message indicates the corresponding user equipment 110, the user equipment 110 may perform a call connection procedure based on the received CC set information.

As shown in FIG. 9, when the CC set selected by the eNB 120 through CAC/LB is matched with the CC set waited by the user equipment 110, the user equipment 110 may perform a call setup procedure without changing CC of CCE.

When the user equipment 110 receives a random access request from the upper layer in operation 922, the user equipment 110 may perform the random access with the eNB 120 through a primary CC (CC-a) in operation 924. In this instance, the random access may be performed using the dedicated preamble received through CC selected by corresponding CCE, or using the selected random preamble.

When a user equipment access to all the CCs constituting a cell is enabled through CAC/LB of the eNB 120, all the CC information may also be included in the paging information. In this instance, the eNB 120 may assign a dedicated preamble to all the CCs.

When the eNB 120 transmits, to the user equipment 110 through all the CCs, the paging message assigned with the dedicated preamble, the eNB 120 may receive a random access preamble of the user equipment 110 and thereby acquire primary CC information of the user equipment 110 and then release the dedicated preamble assigned to another CC in operation 926.

When the user equipment 110 receives a random access request from the upper layer for uplink synchronization in operation 928, the user equipment 110 may acquire the uplink synchronization through the random access in operation 930.

When it is possible to calculate uplink synchronization information of another CC using uplink synchronization information of a particular CC such as CC using a contiguous spectrum, timing alignment may be included in the connection setup admission message. In this case, the user equipment 110 may omit the random access of operation 930 and acquire synchronization.

When the connection setup of CCE (CCE-a, CCE-c) is completed in operation 932, the user equipment 110 may transmit, to the eNB 120 through CC-a, a connection setup complete message indicating that the connection setup is completed, in operation 934.

The above-described exemplary embodiments of the present invention may be recorded in computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A paging method of a user equipment in a carrier aggregation environment, the method comprising:

selecting a component carrier set of the user equipment by selecting a component carrier for each of a plurality of component carrier elements of the user equipment;

camping on a cell through the component carrier selected for each component carrier element;

receiving a paging message from an evolved Node-B (eNB);

verifying a component carrier set that is included in the paging message and thereby is received;

comparing the received component carrier set with the component carrier set of the user equipment; and setting up a connection with the eNB through the component carrier set of the user equipment, when the received component carrier set is the same as the component carrier set of the user equipment, or when all the component carriers are included in the received component carrier set, wherein the setting up comprises performing a random access through a primary component carrier included in the component carrier set of the user equipment, wherein the performing comprises performing the random access of the primary component carrier using a dedicated preamble of the primary component carrier, when the dedicated preamble of the primary component carrier is included in the received component carrier set.

2. The method of claim 1, further comprising:
transmitting, to the eNB, a connection setup complete message indicating that a connection setup with the eNB is completed, when the connection setup is completed with respect to all the component carriers included in the component carrier set of the user equipment.

3. The method of claim 1, further comprising:
changing the component carrier set of the user equipment to the received component carrier set when the received component carrier set is different from the component carrier set of the user equipment; and
setting up the connection with the eNB through the component carrier set of the user equipment.

4. The method of claim 3, wherein the changing comprises changing a primary component carrier and a secondary component carrier, included in the component carrier set of the user equipment, to be the same as a primary component carrier and a secondary component carrier included in the received component carrier set.

5. The method of claim 1, wherein the setting up further comprises:
acquiring an uplink synchronization of a secondary component carrier included in the component carrier set of the user equipment.

6. The method of claim 5, wherein the acquiring comprises acquiring the uplink synchronization by performing the random access through the secondary component carrier.

7. The method of claim 6, wherein the random access through the secondary component carrier is performed using a dedicated preamble of the secondary component carrier when the random access through the primary component carrier is performed, and when the dedicated preamble of the secondary component carrier is received.

8. The method of claim 5, wherein the acquiring comprises acquiring the uplink synchronization of the secondary component carrier using a timing alignment of the secondary component carrier when the random access through the primary component carrier is performed, and when the timing alignment of the secondary component carrier is received.

9. A user equipment paging in a carrier aggregation environment, the user equipment comprising:
at least two component carrier elements, each to communicate with an evolved Node-B (eNB) using a different component carrier;
a control unit to select a component carrier set of the user equipment by selecting a component carrier for each of a plurality of component carrier elements of the user equipment, and to control the user equipment to camp on a cell through the component carrier selected for each component carrier element; and
a paging processing unit to verify a component carrier set that is included in a paging message and thereby is received when the paging message is received from the eNB, to compare the received component carrier set with the component carrier set of the user equipment, and to set up a connection with the eNB through the component carrier set of the user equipment when the received component carrier set is the same as the component carrier set of the user equipment, or when all the component carriers are included in the received component carrier set,
wherein the paging processing unit performs a random access through a primary component carrier included in the component carrier set of the user equipment,
wherein the paging processing unit performs the random access of the primary component carrier using a dedicated preamble of the primary component carrier, when the dedicated preamble of the primary component carrier is included in the received component carrier set.

10. The user equipment of claim 9, wherein when the received component carrier set is different from the component carrier set of the user equipment, the paging processing unit changes the component carrier set of the user equipment to the received component carrier set, and sets up the connection with the eNB through the component carrier set of the user equipment.

* * * * *